(12) United States Patent
Watson

(10) Patent No.: US 8,863,133 B2
(45) Date of Patent: Oct. 14, 2014

(54) LICENSE MANAGEMENT IN A CLUSTER ENVIRONMENT

(75) Inventor: Colin Watson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 128 days.

(21) Appl. No.: 13/152,156

(22) Filed: Jun. 2, 2011

(65) Prior Publication Data

US 2012/0311591 A1 Dec. 6, 2012

(51) Int. Cl.
*G06F 9/46* (2006.01)

(52) U.S. Cl.
CPC ........................................ *G06F 9/46* (2013.01)
USPC ........................................... 718/102; 705/59

(58) Field of Classification Search
None
See application file for complete search history.

(56) References Cited

U.S. PATENT DOCUMENTS

| | | | | |
|---|---|---|---|---|
| 5,845,065 | A * | 12/1998 | Conte et al. | 726/31 |
| 6,944,600 | B2 * | 9/2005 | Stefik et al. | 705/57 |
| 7,752,138 | B1 * | 7/2010 | Dean et al. | 705/59 |
| 7,890,430 | B2 | 2/2011 | Lopatic | |
| 8,250,137 | B1 * | 8/2012 | Nielsen et al. | 709/203 |
| 2003/0074393 | A1 * | 4/2003 | Peart | 709/203 |
| 2006/0021012 | A1 * | 1/2006 | Ito | 726/5 |
| 2006/0064386 | A1 * | 3/2006 | Marking | 705/59 |
| 2006/0080389 | A1 * | 4/2006 | Powers et al. | 709/203 |
| 2006/0179058 | A1 * | 8/2006 | Bram et al. | 707/9 |
| 2006/0287959 | A1 | 12/2006 | Blecken | |
| 2008/0072230 | A1 * | 3/2008 | Jackson | 718/104 |
| 2008/0209423 | A1 * | 8/2008 | Hirai | 718/102 |
| 2008/0229319 | A1 * | 9/2008 | Marchand | 718/104 |
| 2008/0243699 | A1 * | 10/2008 | Hilerio et al. | 705/59 |
| 2008/0276234 | A1 * | 11/2008 | Taylor et al. | 717/177 |
| 2009/0132688 | A1 * | 5/2009 | Kafer et al. | 709/223 |
| 2011/0251868 | A1 * | 10/2011 | Mikurak | 705/7.25 |
| 2011/0276501 | A1 | 11/2011 | Sako et al. | |
| 2012/0110580 | A1 * | 5/2012 | Ghosh et al. | 718/100 |
| 2012/0110591 | A1 * | 5/2012 | Ghosh et al. | 718/104 |
| 2012/0278808 | A1 * | 11/2012 | Nielsen et al. | 718/100 |
| 2012/0297487 | A1 * | 11/2012 | Xia | 726/24 |
| 2012/0311655 | A1 * | 12/2012 | Hohlfeld et al. | 726/1 |

FOREIGN PATENT DOCUMENTS

| | | |
|---|---|---|
| EP | 1674963 B1 | 6/2006 |
| WO | WO 2007132474 A2 | 11/2007 |
| WO | WO 2008073924 A3 | 6/2008 |
| WO | WO 2008139590 A1 | 11/2008 |

* cited by examiner

*Primary Examiner* — Emerson Puente
*Assistant Examiner* — Mehran Kamran
(74) *Attorney, Agent, or Firm* — Ben Tabor; David Andrews; Micky Minhas

(57) ABSTRACT

Embodiments are directed to managing and verifying licenses in a cluster computer system environment. In an embodiment, a license management application running on a computer system cluster manager receives a job that has multiple job tasks as well as portions of job information. The license management application determines from the job information how many licenses and computer nodes are to be assigned to the job. The license management application checks out the determined number of licenses from a license distributing application on behalf of the received job. The license management application indicates to a scheduler of the computer system cluster manager that one job task is to be run per checked out license.

18 Claims, 4 Drawing Sheets

LICENSE MANAGEMENT IN A CLUSTER ENVIRONMENT

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, the execution of a software application may be limited to the number of licenses purchases by the user. For example, an application user may want to perform a real-life simulation of a vehicle. The user may purchase a certain number of licenses (e.g. 50), after which the software designed to simulate the vehicle will be run that number of times (50) simultaneously. The software may be executed using a variety of different parameters. Thus, these types of applications are dependent on having a license before they can be run. These applications are typically configured to communicate directly with a license server to check for a license. Sometimes when many hundreds or thousands of such applications are completing tasks and requesting new licenses, applications may end up being run without first ensuring that the proper license was available.

BRIEF SUMMARY

Embodiments described herein are directed to managing and verifying licenses in a cluster computer system environment. In one embodiment, a license management application running on a computer system cluster manager receives a job that has multiple job tasks as well as portions of job information. The license management application determines from the job information how many licenses and computer nodes are to be assigned to the job. The license management application checks out the determined number of licenses from a license distributing application on behalf of the received job. The license management application indicates to a scheduler of the computer system cluster manager that one job task is to be run per checked out license.

In another embodiment, a license management application running on a computer system cluster manager receives a job that has multiple job tasks as well as portions of job information. The license management application determines from the job information how many licenses and computer nodes are to be assigned to the job. The license management application checks out the determined number of licenses from a license distributing application on behalf of the received job. The license management application indicates to a scheduler of the computer system cluster manager that one job task is to be run per checked out license. The license management application sends a query to the license distribution application to verify the current use status of each license. The verifying includes adding a signed token to various different environment variables used by the computer node. The computer node implements encryption to verify that the computer system cluster manager signed the token.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
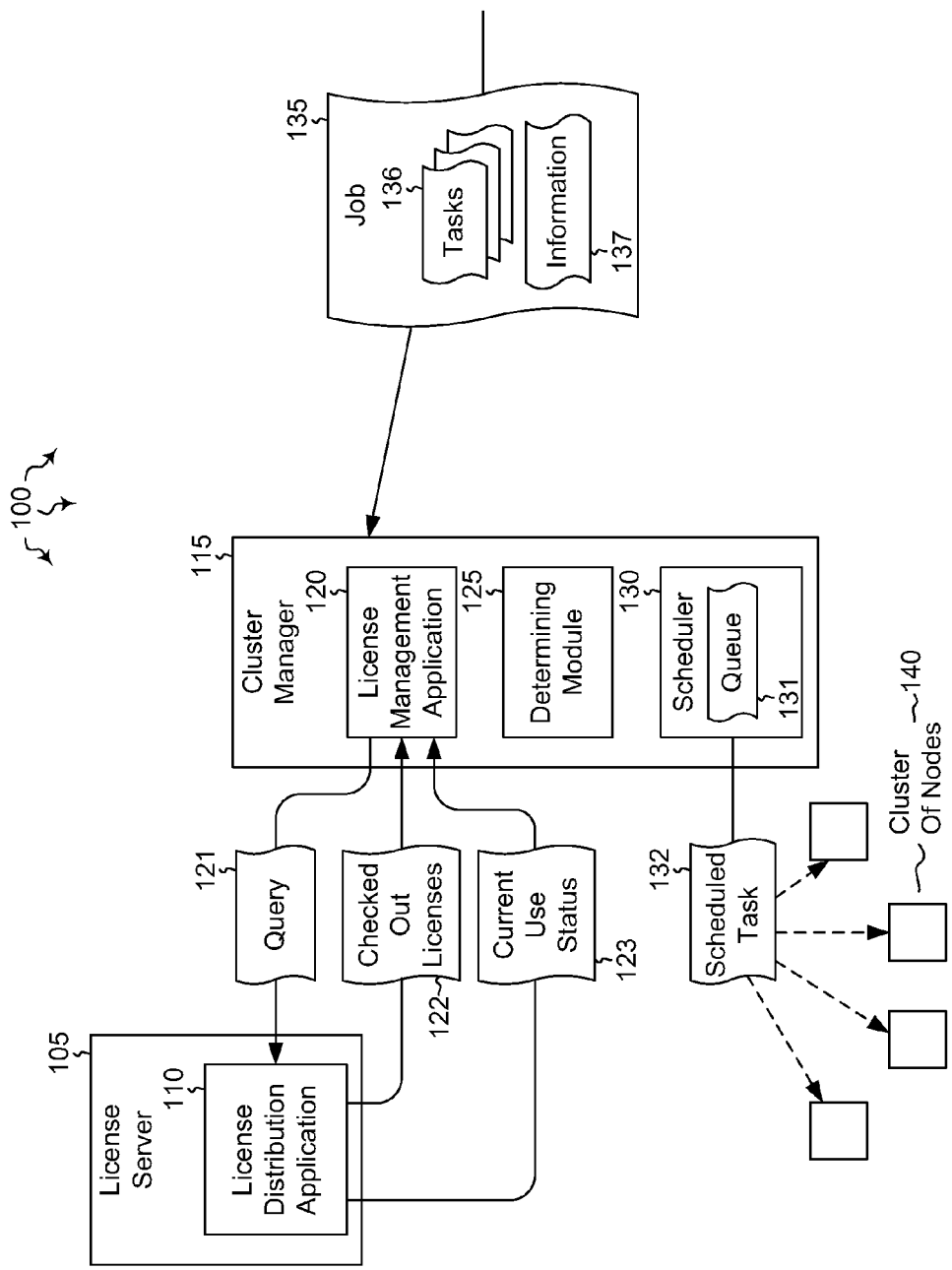
FIG. 1 illustrates a computer architecture in which embodiments of the present invention may operate including managing and verifying licenses in a cluster computer system environment.

Embodiments described herein are directed to managing and verifying licenses in a cluster computer system environment. In one embodiment, a license management application running on a computer system cluster manager receives a job that has multiple job tasks as well as portions of job information. The license management application determines from the job information how many licenses and computer nodes are to be assigned to the job. The license management application checks out the determined number of licenses from a license distributing application on behalf of the received job. The license management application indicates to a scheduler of the computer system cluster manager that one job task is to be run per checked out license.

In another embodiment, a license management application running on a computer system cluster manager receives a job that has multiple job tasks as well as portions of job information. The license management application determines from the job information how many licenses and computer nodes are to be assigned to the job. The license management application checks out the determined number of licenses from a license distributing application on behalf of the received job. The license management application indicates to a scheduler of the computer system cluster manager that one job task is to be run per checked out license. The license management application sends a query to the license distribution application to verify the current use status of each license. The verifying includes adding a signed token to various different environment variables used by the computer node. The computer node implements encryption to verify that the computer system cluster manager signed the token.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes cluster manager 115. The cluster manager manages computer cluster 140. The cluster may include any number of nodes, and nodes may be added or removed from the cluster at any time. The cluster manager may use a task scheduler 130 to schedule tasks that are to be processed by the cluster. These scheduled tasks 132 may be queued for processing in queue 131, and then sent to the various cluster nodes for processing.

The cluster manager also includes a license management application 120 that manages application licenses. In some cases, applications are only allowed to be run if a corresponding license is available. For example, sophisticated simulation programs run on many different computing nodes may require (potentially expensive) licenses to be acquired and stored in a license server before the simulation can be run. Such application licenses may be stored in license server 105. The licenses may be checked out by the license management application (LMA) on behalf of a given application. The LMA may send a query 121 to the license server requesting a license on behalf of an application that is to be run. The license server's license distribution application then sends the checked out licenses 122 to the LMA. The application may then be run using the checked out licenses. These concepts will be explained in greater detail below with regard to methods 200 and 300 of FIGS. 2 and 3.

Figure 2:
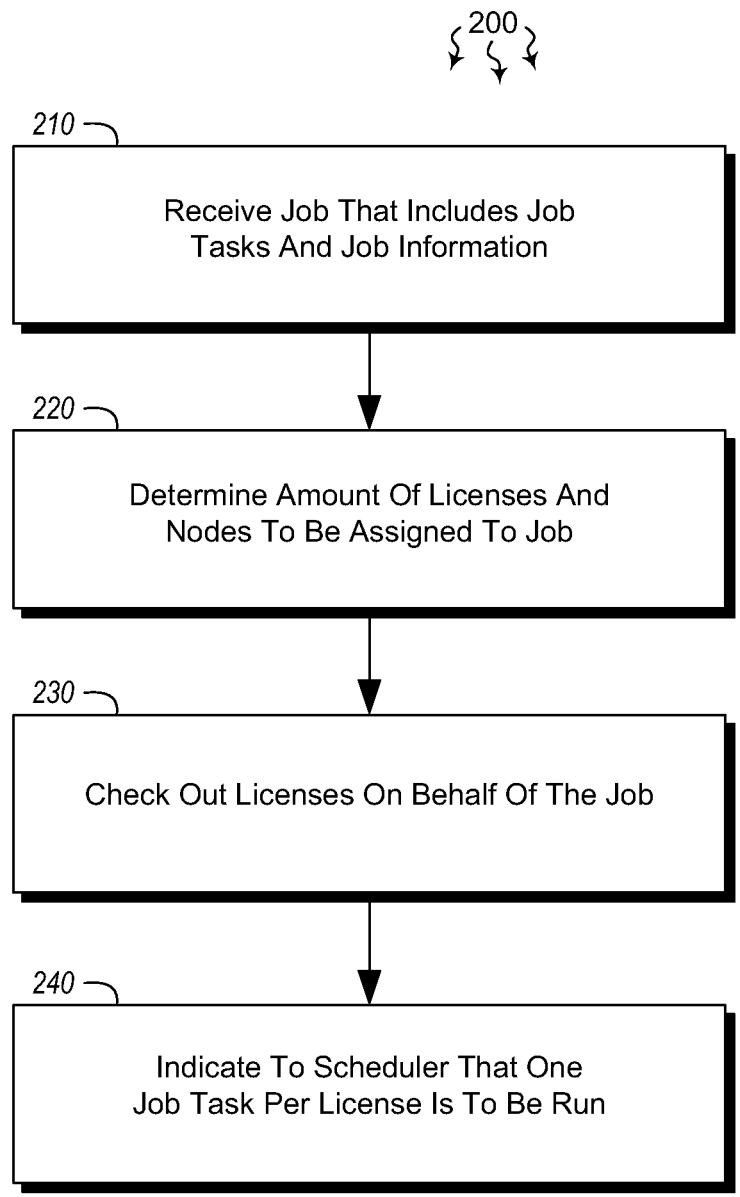
FIG. 2 illustrates a flowchart of an example method for managing licenses in a cluster computer system environment.
Figure 3:
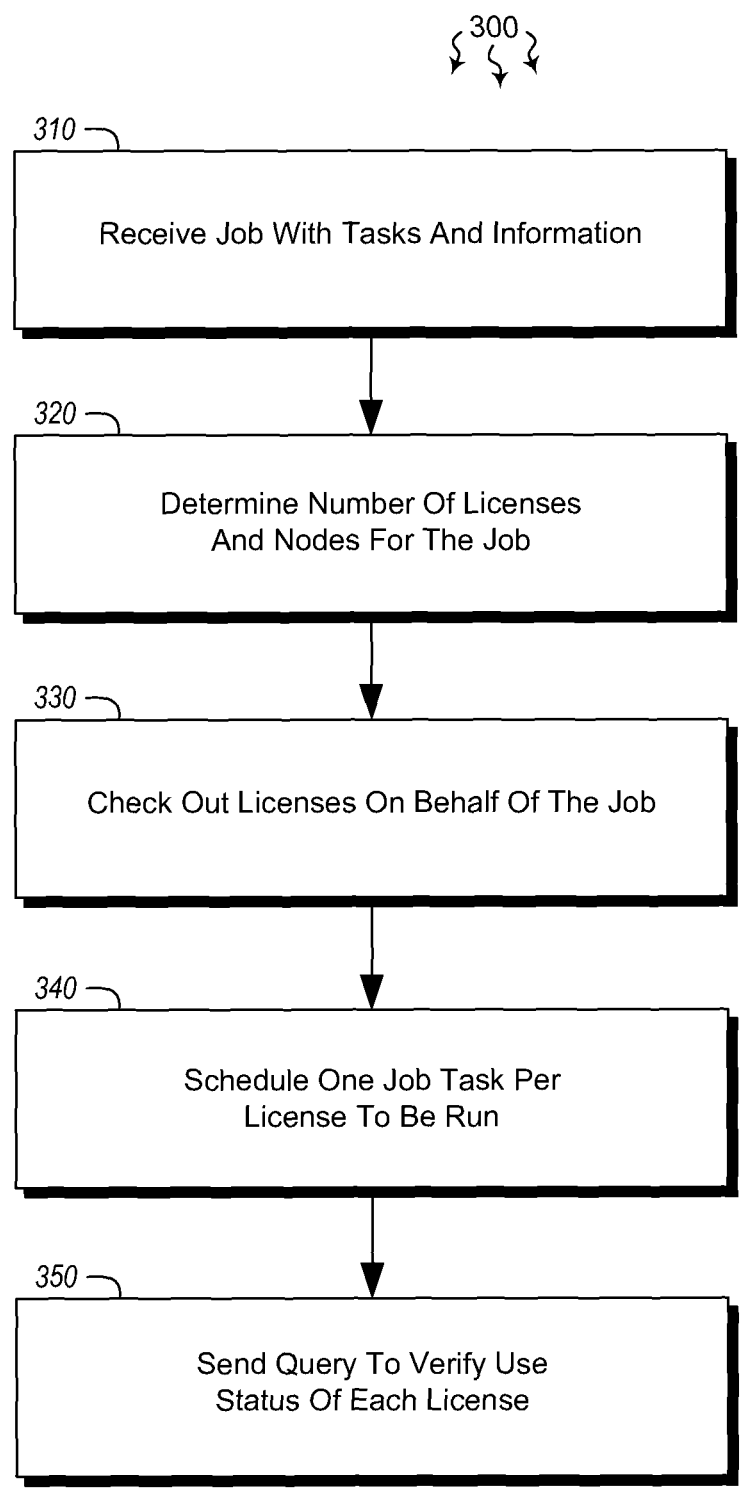
FIG. 3 illustrates a flowchart of an alternative example method for managing and verifying licenses in a cluster computer system environment.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for managing licenses in a cluster computer system environment. The method 200 will now be described with frequent reference to the components and data of environment 100.

Method 200 includes an act of receiving a job at a license management application running on a computer system cluster manager, wherein the job includes one or more job tasks and one or more portions of job information (act 210). For example, license management application (LMA) 120 on cluster manager 115 may receive a job 135 that is to be executed by the cluster of nodes 140. The job includes various different tasks 136, as well as job information 137 identifying characteristics of the job. Each job may include substantially any number of tasks, which may, in turn, be executed on substantially any number of computer systems in the cluster. The determining module 125 may be configured to determine precisely which licenses and how many licenses are needed to processes each of the job tasks. The tasks may be scheduled for execution by scheduler 130, upon the scheduler verifying that a license for running the job has been obtained.

The license management application determines from the job information 137 how many licenses and computer nodes are to be assigned to process the job's tasks (act 220). For instance, if the job has multiple tasks, the job information might indicate that a license is to be obtained before executing one or more of those tasks. The license may allow the use of certain selected tasks or all tasks, and may further specify the number of times each task (or the job as a whole) is allowed to be executed. In some embodiments, a license has to be obtained before any of the job's tasks can be executed.

After receiving the incoming job, the license management application checks out the determined number of licenses from the license distributing application 110 on behalf of the received job (act 230). For example, if the job 135 indicated in the job information that one license was required for each task that was to be processed, the LMA may indicate to the license distribution application in query 121 how many license are to be checked out for the job. The license distribution application 110 of license server 105 may then send the checked-out licenses 122 to the LMA (and/or to the scheduler 130). In cases where the checked-out licenses are sent to the LMA, the LMA may indicate to the scheduler of the computer system cluster manager that one job task is to be run per checked out license (act 240).

While the example of one license per job task is given, it should be noted that substantially any licensing scheme may be used. Applications or jobs may require different numbers and/or types of licenses for entire jobs or single job tasks. Accordingly, the scheduler 130 may be configured to schedule jobs in different manners, specific to the licensing scheme used. Thus, for example, if a task is to be run on multiple nodes simultaneously (or substantially so), the scheduler can schedule the tasks to wait until a sufficient number of nodes are available so that all the tasks can be run simultaneously. Other schemes are also possible, such as with job tasks that are to be run sequentially or in a certain order. The licenses may be checked out beforehand, whereupon the tasks are executed once the requisite number of processing nodes is ready.

In this manner, the computer system cluster manager scheduler 130 may schedule each job task for execution on the computer nodes of the computer system cluster 140 in response to the incoming job 135. In some cases, the LMA may determine that an insufficient amount of licenses are available to execute each of the job's tasks 136. The scheduler may then queue the job until the enough licenses are available to process each of the job's tasks. In some cases, the license management application may receive an indication that one or more of the licenses currently being used to execute job tasks have been revoked. This may occur, for example, if a client has not paid for the licenses, or if the client's licenses have expired. The job being executed may then be cancelled as a result of the license revocation.

In cases where a job has been cancelled due to license revocation or some other reason, the scheduler may be configured to re-queue the cancelled job. The job may be re-queued once the licenses have become available. Upon resuming a job that was re-queued, job tasks that were previously processed are not reprocessed, thus avoiding duplication of effort. Moreover, job task execution will resume with the task that was currently being processed when the job was cancelled. In some cases, if more computer nodes become available while the job is being processed, and more licenses are available, one or more of those computer nodes may be dynamically added to the computer nodes that are processing the job. Conversely, computer nodes may be removed if licenses are revoked or otherwise become unavailable during processing. Any licenses that are no longer being used (e.g. due to down or otherwise busy nodes) are returned to the license distribution application for distribution to other jobs.

Turning now to FIG. 3, FIG. 3 illustrates a flowchart of an alternative method 300 for managing licenses in a cluster computer system environment. The method 300 will now be described with frequent reference to the components and data of environments 100 and 400 of FIGS. 1 and 4, respectively.

Method 300 includes an act of receiving a job at a license management application running on a computer system cluster manager, wherein the job includes one or more job tasks and one or more portions of job information (act 310). For example, license management application 420 of cluster manager 415 may receive job 435. The job includes various different tasks 432 that are to be processed by the cluster of computer nodes 440. The job also includes information describing characteristics of the job, including how many licenses are needed to process the job's tasks.

The license management application then determines from the job information how many licenses and computer nodes are to be assigned to the job (act 320). As mentioned above, each job may have a different number of tasks, and each job may require a different number of licenses for it to be run. The determining module 125 of the cluster manager may be used to determine how many licenses are needed for the job that was received. Once the number is known, the license management application checks out the determined number of licenses from the license distributing application 410 on behalf of the received job (act 330). The license management application then indicates to the scheduler 430 that at least one job task is to be run per checked out license (act 340). In some cases, the license management application and/or scheduler may determine that multiple different jobs are to use the same licenses. As such, the license management application may check out multiple licenses from the license distribution application and use those licenses to run multiple jobs serially, in parallel, or both.

Method 300 also includes an act of the license management application sending a query to the license distribution application to verify the current use status of each license, the verifying including adding a signed token to one or more environment variables used by the computer node, wherein the environment variables include at least one of a job number, a cluster name, a date and a time, and wherein the computer node implements encryption to verify that the computer system cluster manager signed the token (act 350). For example, license management application 420 may send a query (e.g. 121) to the license distribution application of license server 405 to determine which licenses are currently being used. The license distribution application may send the current use status 123 for the requested licenses, indicating whether the license is currently being used, whether has been checked out and whether it is scheduled for use with a job.

Verifying the current use status may include adding a signed token to a job number, a cluster name, a date and/or time or other environment variable. In other cases, other mechanisms such as configuration files may be used to pass the signed token to the application instead of an environment variable. The computer cluster nodes may then use some form of encryption to verify that the cluster manager signed the token. This allows clients to verify the use status of their licenses. A client can verify that their license has or has not been used, and can see when the license was used in the past. In some cases, a computer node from the cluster of nodes 440 may contact the scheduler 430 to verify that the job is running on the computer node that was assigned to the job by the scheduler. The computer node running the job task may communicate directly with the license distribution application to verify that the licenses corresponding to the job have been properly checked out.

Figure 4:
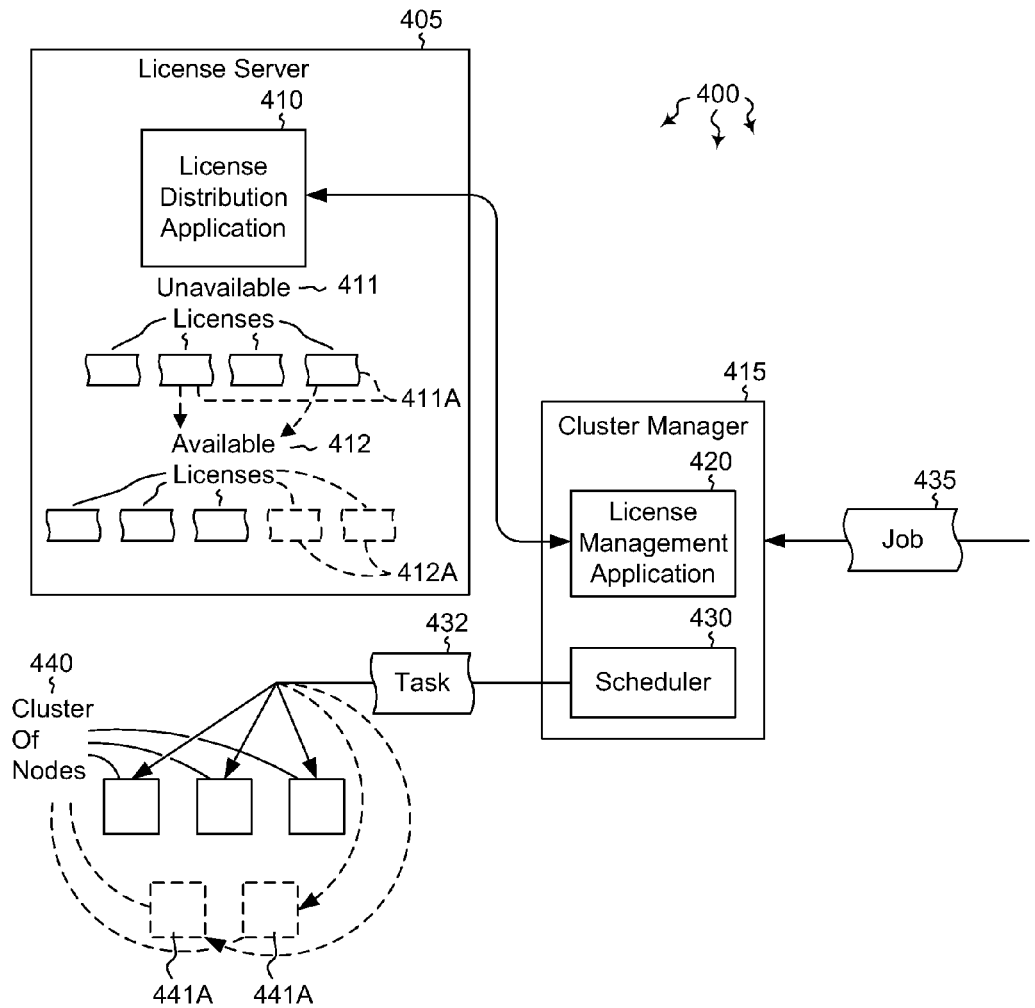
FIG. 4 illustrates a computer architecture in which embodiment of the present invention may operate including managing and verifying licenses in a cluster computer system environment.

As explained above, computing nodes may be added to jobs as nodes and corresponding licenses become available. For instance, as shown in FIG. 4, the license server 405 may include multiple different licenses that are currently unavailable (e.g. 411). Some of the unavailable licenses may later become available (e.g. licenses 411A). These may be added to the group of available licenses 412 as licenses 412A. In response to the two new licenses becoming available, two new computer nodes (441A) may be added to the cluster of nodes processing the received job.

Accordingly, methods, systems and computer program products are provided which manage licenses in a cluster computer system environment. Licenses may be checked out on behalf of an application, and that application may be run as soon as the requisite number of licenses has been made available.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. At a cluster management computer system including at least one processor and a memory, in a computer networking environment including a plurality of computing systems, a computer-implemented method for managing licenses in a cluster computer system environment, the method comprising:

an act of receiving a job at a license management application running on the cluster manager computer system, wherein the job includes a plurality of job tasks and one or more portions of job information, wherein the cluster manager computer system is configured to assign the plurality of job tasks among computer nodes that each execute a corresponding application that performs any assigned job tasks, and wherein each corresponding application is permitted to perform assigned job tasks only if a corresponding license is available for the assigned job tasks;

an act of the license management application determining from the job information that a plurality of computer nodes that are separate from the cluster manager computer system are to be assigned to process the plurality of job tasks, and that at least one license is needed for each of the plurality of job tasks;

an act of the license management application determining that insufficient licenses are available to execute each of the plurality of job tasks, and queuing the job until enough licenses are available to process each of the plurality of job tasks;

when enough licenses are available to process each of the plurality of job tasks, and prior to scheduling the plurality of job tasks, an act of the license management application checking out a corresponding license from a license distributing application on behalf of each of the plurality of job tasks, such that the license management application checks out a plurality of licenses for the plurality of job tasks; and subsequent to checking out the plurality of licenses for the plurality of job tasks, an act of the license management application scheduling the plurality of job tasks to run on the plurality of computer nodes, including scheduling each job task for execution on a different computer node of the plurality of computer nodes, while indicating to a scheduler that one job task of the plurality of job tasks is to be run per checked out license of the plurality of licenses.

2. The method of claim 1, further comprising:

an act of receiving at the license management application an indication that one or more of the licenses currently being used to execute job tasks have been revoked; and an act of canceling the job being executed.

3. The method of claim 1, further comprising an act of the scheduler re-queuing the job that was canceled due to the revoked licenses, wherein upon resuming jobs that were re-queued, job tasks that were previously processed are not reprocessed and job task execution resumes with the task that was currently being processed when the job was canceled.

4. The method of claim 1, wherein if more computer nodes become available while the job is being processed, and more licenses are available, one or more computer nodes are dynamically added to the plurality of computer nodes that are processing the job.

5. The method of claim 1, wherein if computer nodes currently processing job tasks become unavailable, one or more computer nodes are dynamically removed from the plurality of computer nodes that are processing the job.

6. The method of claim 5, wherein any licenses that are no longer being used as a result of removing one or more computer nodes are returned to the license distribution application.

7. The method of claim 1, wherein the cluster management computer system communicates with the license distribution application to verify the current use status of each license.

8. The method of claim 7, wherein verifying the current use status of each license comprises adding a signed token to one or more environment variables used by a computer node, wherein the environment variables include at least one of a job number, a cluster name, a date and a time, and wherein the computer node implements encryption to verify that the cluster manager computer system signed the token.

9. The method of claim 8, wherein the computer node contacts the scheduler to verify that the job is running on the computer node that was assigned to the job by the scheduler.

10. The method of claim 7, wherein the computer node running the job task communicates directly with the license distribution application to verify that the licenses corresponding to the job have been properly checked out.

11. The method of claim 10, wherein the cluster manager computer system annotates the checked out licenses to provide further evidence that the computer node is licensed to execute the job task.

12. A computer program product for implementing a method for managing licenses in a cluster computer system environment, the computer program product comprising one or more hardware storage devices having stored thereon computer-executable instructions that, when executed by one or more hardware processors of a cluster management computing system, cause the cluster management computing system to perform the method, the method comprising:

an act of receiving a job at a license management application running on the cluster manager computer system, wherein the job includes a plurality of job tasks and one or more portions of job information, wherein the cluster manager computer system is configured to assign the plurality of job tasks among computer nodes that each execute a corresponding application that performs any assigned job tasks, and wherein each corresponding application is permitted to perform assigned job tasks only if a corresponding license is available for the assigned job tasks;

an act of the license management application determining from the job information that a plurality of computer nodes that are separate from the cluster manager computer system are to be assigned to process the plurality of job tasks, and that at least one license is needed for each of the plurality of job tasks;

an act of the license management application determining that insufficient licenses are available to execute each of the plurality of job tasks, and queuing the job until enough licenses are available to process each of the plurality of job tasks;

when enough licenses are available to process each of the plurality of job tasks, and prior to scheduling the plurality of job tasks, an act of the license management application checking out a corresponding license from a license distributing application on behalf of each of the plurality of job tasks, such that the license management application checks out a plurality of licenses for the plurality of job tasks; and subsequent to checking out the plurality of licenses for the plurality of job tasks, an act of the license management application scheduling the plurality of job tasks to run on the plurality of computer nodes, including scheduling each job task for execution on a different computer node of the plurality of computer nodes, while indicating to a scheduler that one job task of the plurality of job tasks is to be run for each license of the plurality of licenses that was checked out.

13. The computer program product of claim 12, wherein the cluster management computer system communicates with the license distribution application to verify the current use status of each license.

14. The computer program product of claim 13, wherein verifying the current use status of each license comprises adding a signed token to one or more environment variables used by a computer node, wherein the environment variables include at least one of a job number, a cluster name, a date and a time, and wherein the computer node implements encryption to verify that the cluster manager computer system signed the token.

15. The computer program product of claim 14, wherein the computer node contacts the scheduler to verify that the job is running on the computer node that was assigned to the job by the scheduler.

16. The computer program product of claim 13, wherein the computer node running the job task communicates directly with the license distribution application to verify that the licenses corresponding to the job have been properly checked out.

17. A computer system comprising the following:

one or more hardware processors;

system memory;

one or more computer-readable storage media having stored thereon computer-executable instructions that, when executed by the one or more processors, causes the computing system to perform a method for managing licenses in a cluster computer system environment, the method comprising the following:

an act of receiving a job at a license management application running on a cluster manager computer system, wherein the job includes a plurality of job tasks and one or more portions of job information, wherein the cluster manager computer system is configured to assign the plurality of job tasks among computer nodes that each execute a corresponding application that performs any assigned job tasks, and wherein each corresponding application is permitted to perform assigned job tasks only if a corresponding license is available for the assigned job tasks;

an act of the license management application determining from the job information that a plurality of computer nodes that are separate from the cluster manager computer system are to be assigned to process the plurality of job tasks, and that at least one license is needed for each of the plurality of job tasks;

an act of the license management application determining that insufficient licenses are available to execute each of the plurality of job tasks, and queuing the job until enough licenses are available to process each of the plurality of job tasks;

when enough licenses are available to process each of the plurality of job tasks, and prior to scheduling the plurality of job tasks, an act of the license management application checking out a corresponding license from a license distributing application on behalf of each of the plurality of job tasks, such that the license management application checks out a plurality of licenses for the plurality of job tasks; and subsequent to checking out the plurality of licenses for the plurality of job tasks, an act of the license management application scheduling the plurality of job tasks to run on the plurality of computer nodes, including scheduling each job task for execution on a different computer node of the plurality of computer nodes, while indicating to a scheduler that one job task of the plurality of job tasks is to be run per checked out license of the plurality of licenses.

18. The method of claim 1, wherein least one license specifies a number of times each task is allowed to be executed.

* * * * *